May 9, 1961 S. B. THOMAS 2,983,775
LIQUID ISOMERIZATION PROCESS USING A SPRAY TOWER
Filed June 25, 1958
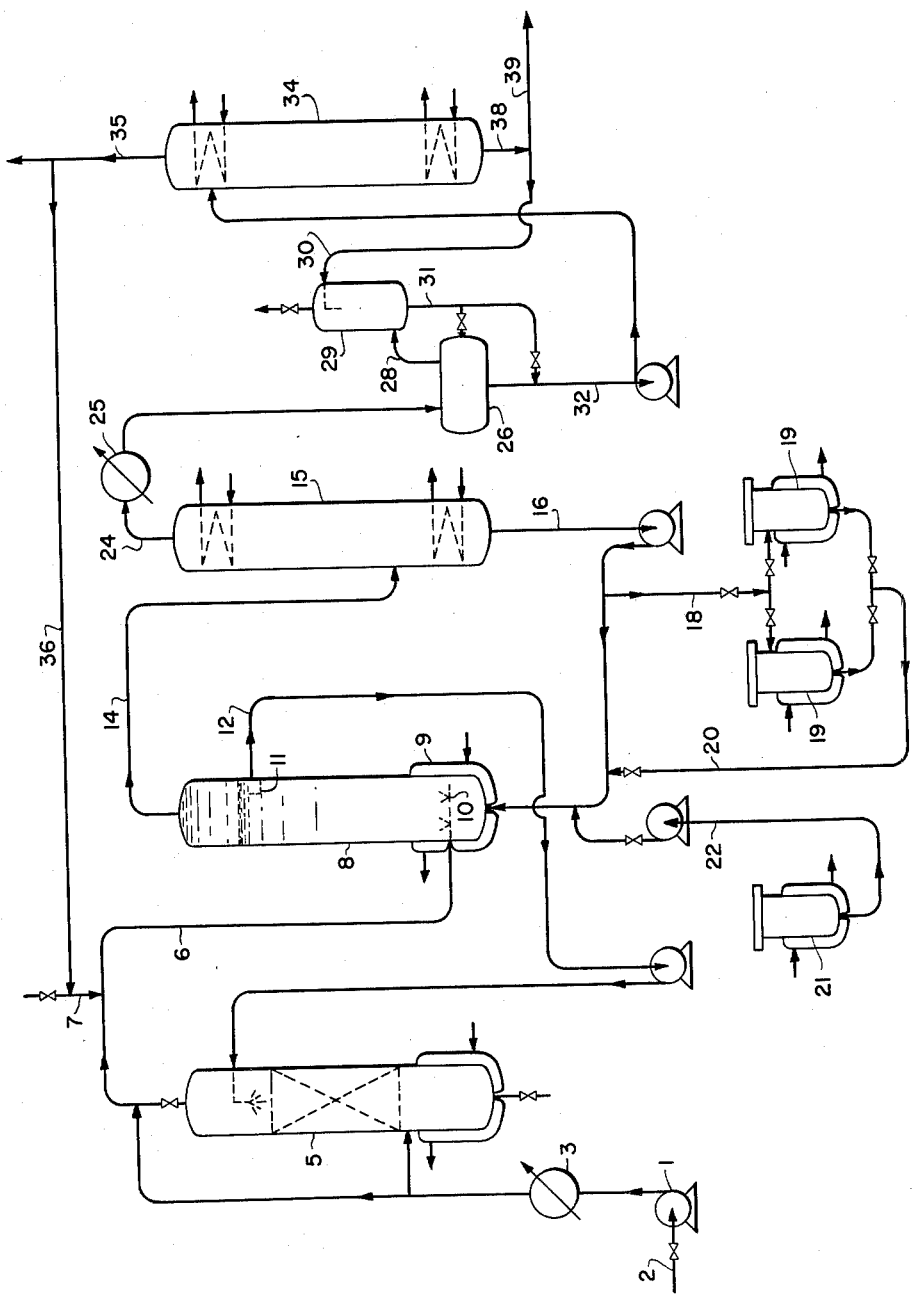
INVENTOR:
SAMUEL B. THOMAS
BY: *Martin S. Baer*
HIS ATTORNEY United States Patent Office 2,983,775
Patented May 9, 1961

2,983,775
LIQUID ISOMERIZATION PROCESS USING A SPRAY TOWER

Samuel B. Thomas, Long Beach, Calif., assignor to Shell Oil Company, a corporation of Delaware Filed June 25, 1958, Ser. No. 744,553
4 Claims. (Cl. 260—683.75)

This invention relates to an improved process and apparatus for effecting catalytic conversions in the liquid phase with fluid catalysts. A particular aspect of the invention relates to the liquid-phase isomerization of saturated hydrocarbons with a catalyst of the molten salt type, in particular a molten salt mixture comprising aluminum chloride and antimony trichloride.

Catalysts of the type referred to are known to the art. Aluminum chloride and antimony trichloride form fusible mixtures which have excellent catalytic activity and melt to form free-flowing liquids at relatively low temperatures. These catalysts may be used in the form of mobile liquids at temperatures even below 100° C.

When catalysts of the molten salt type are used in the isomerization of hydrocarbons, sludges are formed which are presumably complex compounds comprising side reaction products and aluminum chloride. These sludges are substantially insoluble in the reactant feed, but are appreciably soluble in the catalyst melt. The accumulation of sludge in the catalyst and the changes in catalyst composition which are caused by dissolving out of catalyst components from the melt into the hydrocarbon product are objectionable in that they increase the melting point and viscosity of the catalyst and decrease its activity. It is desirable to continuously remove sludge components from the fluid catalyst melt so that the catalyst continuously in use consists essentially of a mixture of metal salts and contains only a small, controlled proportion of complex of aluminum chloride with hydrocarbons.

In some of the isomerization processes known to the prior art complexes or sludges formed by reaction of Friedel-Crafts catalysts, especially aluminum chloride, with hydrocarbons are used as the isomerization catalysts. These complexes have viscosities of about 40 centipoise and specific gravities of about 1.3–1.5. At isomerization temperatures they are catalysts of relatively low activity.

By contrast, the fluid melt catalysts employed in the present invention have substantially higher specific gravities, about 2.5–3, a typical value being about 2.7, and viscosities at isomerization temperatures of about 7 centipoise. The fluid melts are catalysts of relatively high activity.

The reactors in the commercial isomerization plants employing fluid melt catalysts of the type described are of the mixer type. Such vessels have a relatively low length-to-diameter ratio and contain mechanical stirring means to provide a substantially uniform emulsion of catalyst melt and hydrocarbon in the main reaction zone of the reactor. A settling zone is provided for separating hydrocarbon from the catalyst melt prior to withdrawal of the hydrocarbon as product of the reaction.

It has now been found that a substantial improvement in fluid melt-catalyzed hydrocarbon isomerization is obtained by substituting for the stirred reactor a vessel of relatively high length-to-diameter ratio containing an emulsion of hydrocarbon-in-catalyst, the hydrocarbon continuously passing by gravity through the catalyst from the bottom of the reaction zone to the top.

It is an object of the present invention to provide an improved process and apparatus whereby isomerization with fluid melt catalysts can be effected in a more practical and economical manner, resulting in a substantial increase of conversion to isomerized product over that possible in the prior art processes. It is a specific object to provide an improved process for the isomerization of n-butane to isobutane. It is a further specific object to provide an improved process for the conversion of n-pentane to isopentane.

For purposes of illustration the present invention will be described in its application to the isomerization of butane. The description will be made with reference to the accompanying drawing forming part of this specification wherein the sole figure shows a more or less diagrammatic elevational section of a form of apparatus suitable for carrying out the invention.

Referring to the drawing, a stream of liquid n-butane of high purity, e.g. 98 percent n-butane, from any suitable source is forced by means of pump 1 through valved line 2 into a suitable heating zone 3 wherein it is heated to a temperature sufficiently high to maintain the desired temperature conditions in a subsequent scrubbing and/or reaction zone. From the heating zone the heated hydrocarbon stream is passed into extraction column 5. Within extraction column 5 the hydrocarbon stream is contacted in the liquid phase with a portion of catalyst emanating from the reaction zone as described more fully below. Liquid butane containing extracted catalyst components is passed from extraction column 5 through valved line 6 into a reactor. The reactor consists of vertical column 8 which is suitably a pipe having a height of about 20 to 50 feet and a diameter of form about 1 to about 3½ feet, the length-to-diameter ratio being at least about 12:1. The lower section of the column is provided with heating means 9, illustrated as a heating jacket; any other suitable heating means may be used. The reactants are injected into the column from line 6 through distributor 10. Catalyst from a source described in more detail hereafter is injected into the bottom of the column through line 16. A suitable catalyst, for butane isomerization, consists of a molten mixture of antimony chloride and aluminum chloride in approximate proportions of 84 to 96 percent by weight $SbCl_3$ and 16 to 4 percent by weight $AlCl_3$. The major portion of the column, from the hydrocarbon injection point up to and beyond catalyst draw-off 11 is filled with emulsion of hydrocarbon-in-fluid melt catalyst. The hydrocarbon passes up through the catalyst in the form of droplets; the catalyst is the continuous phase.

The temperature in the reaction zone may range from the minimum temperature at which the catalyst can be maintained in the fluid state up to approximately 100° C. A particularly effective temperature may comprise for example a temperature in the range of from about 68° to about 95° C. The pressure in the reaction zone may vary from the minimum pressure required to maintain the butane in the liquid phase to any desired superatmospheric pressure. Pressures in the range of from 125 to 500 pounds gauge, for example, are quite suitable.

The isomerization is preferably effected in the presence of a hydrogen halide such as hydrogen chloride. This is preferably introduced with the hydrocarbon feed. Hydrogen chloride is drawn from any outside source through valved line 7 leading into line 6. The amount of hydrogen chloride introduced into the system may vary widely in accordance with the nature of the charge, the catalyst composition and the operating conditions. In cases where it is not desired to recover and recycle the hydrogen chloride, the minimum quantities, such as from about 0.3 to 5 percent by weight of the hydrocarbon feed, may be employed. When the hydrogen chloride is recycled, however, much larger quantities, for instance, up to 25 percent by weight of the butane charge may be economically employed. Concentrations between 4 and 8 percent are preferred. If desired, a limited amount of hydrogen may be introduced with the hydrogen chloride to suppress cracking or other undesirable side reactions.

There is provided a catalyst draw-off means 11 by which a small proportion of fluid catalyst melt is continually withdrawn from the reaction. The withdrawn catalyst is pumped through line 12 to the upper part of extraction column 5, where it passes in countercurrent flow to the up-flowing liquid butane feed. In its passage through column 5 catalyst components are dissolved in the butane stream and passed therewith to reactor 8. Another portion of the catalyst, which is of reduced activity with respect to its ability to catalyze the isomerization reaction, remains insoluble in the hydrocarbon stream and is separated therein as a heavier fluid catalyst residue which is removed from the bottom of column 5. This is mainly a hydrocarbon-$AlCl_3$ complex.

The hydrocarbon charge to scrubber 5 is preferably heated to a temperature favorable to the extraction operation. This temperature will vary with the nature of the material being treated and the particular catalyst used. Temperatures in the approximate range of from 50° to 125° C. and preferably from 50° to 100° C. are suitable. The pressure within column 5 is sufficiently high to maintain the hydrocarbon stream passing therethrough in the liquid phase.

The rate at which catalyst is withdrawn from reactor 8 and passed to column 5 will vary with operating conditions. This withdrawal should be at a rate sufficiently high to prevent the accumulation of sludge in reactor 8. A typical value is about 5 percent of total catalyst in the reactor per hour, or, on a different basis, about 0.012 volume per volume of butane feed per hour. Suitable ranges are from 3 to 8 percent, basis catalyst holdup or from 0.008 to 0.018 volume per volume of feed per hour.

With proper operation of reactor 8, containing an upper settling zone of about one-eighth to one-fourth part of the total length of the reactor, at most only a very small amount of the fluid melt catalyst is carried out of the column by entrainment. The hydrocarbon product leaving reactor 8 through line 14 does, however, contain a substantial proportion of catalyst components in solution and particularly of antimony trichloride in solution. The reaction product is therefore passed to catalyst separating column 15. Within column 15 hydrocarbons comprising butane and isobutane and HCl are separated as a vapor fraction from a liquid fraction comprising essentially components of the fluid melt catalyst and largely $SbCl_3$. The liquid fraction is returned to the reactor through line 16.

Provision is made for continuously maintaining the activity of the catalyst in vessel 8 by adding make-up aluminum chloride. To do this, a portion of the antimony chloride stream from the bottom of column 15 may be by-passed through valved line 18 into one or the other of the heated aluminum chloride-containing vessels 19, where the liquid $SbCl_3$ is saturated with $AlCl_3$, and then passed through line 20 back to line 16 and to reactor 8. When make-up $SbCl_3$ is required it is pumped in liquid form out of heated $SbCl_3$ vessel 21 through line 22 into line 16 and reactor 8.

The vapor fraction from column 15 passes through overhead line 24 containing cooler 25 into accumulator 26. In cooler 25 the stream is cooled to condense butane.

Uncondensed material comprising hydrogen chloride and some inert gas and light hydrocarbon gas formed in the system is continuously or intermittently withdrawn from accumulator 26 through line 28 and introduced into to the lower part of an absorber 29 where it is contacted with a suitable scrubbing medium introduced into the upper part of the absorber by line 30. HCl is absorbed by the scrubbing medium. Overhead, comprising vapors and gas substantially free of any HCl, may be discarded from the system. If it contains valuable constituents, e.g. hydrogen, these may be recovered and returned to the reactor. The bottoms fraction from absorber 29 contains HCl dissolved in reaction product. This is withdrawn through line 31 and may be returned to separator 26 or passed to line 32. Line 32 is used to withdraw liquid from separator 26 from where it is pumped into HCl-stripping column 34. Within column 34 a vapor fraction comprising HCl is separated from a liquid fraction comprising mainly butane and isobutane. The vapor fraction is passed through line 35 and 36 to line 7 for return to the reaction zone. Make-up HCl is introduced as required into line 7 from an extraneous source. Liquid is taken from the lower part of column 34 via line 38. This liquid comprises the total isomerization reaction product. A part of it is returned to HCl scrubber 29 via line 30 and the major portion is removed through line 39 for further use as required. It is conventional to pass the total isomerization product to a caustic washing step to remove any residual acidic components. The isomerization product as a whole may be employed as charge stock to an alkylation plant or it may be separated by fractional distillation to recover isobutane of high purity.

The use of the stirred reactor of the prior art in isomerization of n-butane is illustrated by a run in which butane was isomerized in the liquid phase with a catalyst melt consisting of 92.5 percent of $SbCl_3$ and 7.5 percent $AlCl_3$ at a temperature of 80° C. and a pressure of approximately 400 pounds gauge in a mixer-type reactor. The catalyst-to-hydrocarbon ratio in the reactor was 1:1 and the average contact time 13 to 15 minutes. Hydrogen chloride in the amount of 4 percent by weight was added to the butane charge. For a period of 144 hours of continuous operation an average conversion to isobutane of 41% was obtained; that is, an average of 41 mole percent of isobutane was obtained in the total hydrocarbon reaction products.

In a comparable run employing the relatively stationary emulsion reaction mixture in accordance with this invention, the reactor was a vertical pipe of 12 inches diameter and 37 feet in height. The catalyst melt consisted of 93 percent by weight of $SbCl_3$ and 7 percent by weight $AlCl_3$. The reaction temperature was about 85° C. and the pressure approximately 300 pounds gauge. Butane was continuously charged to maintain a level of emulsion equivalent to about 1.4 times the volume of fluid catalyst in the reactor. The emulsion level was about 30 feet above the feed injection point. The superficial butane velocity was 2.5 feet per minute. While these conditions were maintained, the concentration of isobutane in the butane product was about 64 percent. The liquid hourly space velocity, based on catalyst volume, was approximately 7 v./v./hr., equivalent to a contact time of 8.6 minutes.

It is evident that the improved method of carrying out the reaction results in a much higher conversion of n-butane to isobutane in a much shorter contact time.

In the above example the butane was introduced into the bottom of the column through a distributor consisting of a 1-inch pipe having ten holes of $3/16$-inch diameter. No significant change in results was obtained when the butane inlet device was a simple pipe having a single opening $5/8$ inch in diameter.

The operation of the reactor in accordance with this invention is based on the relationships of the densities of butane and the fluid melt catalyst, the activity of the fluid melt catalyst and the maintenance of the proper flow rate of butane through the reactor.

It is desirable that the hydrocarbon pass through the reactor in the form of relatively small droplets, e.g., having from $1/100$ to $1/4$-inch diameter. At the high nozzle velocity of 15 ft./sec., employed in the above-described experiments, the size of the nozzle opening does not significantly affect the drop size in the reactor. A convenient range of nozzle velocities is from 8 to 20 ft./sec.

Most of the operating conditions suitable for use in butane isomerization have been described in connection with the illustration and example.

While the superficial butane velocity in the particular example was 2.5 feet per minute, other runs were made in similar equipment under similar conditions and with equally good results in which the velocity was as high as 5 feet per minute. A suitable range of superficial velocities for butane feed is in the range from 1 to 10 feet per minute. At the higher velocities in the range, the proportion of hydrocarbon in the emulsion in the reaction zone is relatively high. This proportion is generally in the range from 10 to 50 percent by volume and preferably between 20 and 40 percent.

When using the process of this invention, isobutane concentrations of 62 to 64 percent were obtained in the product. In general, by following the process of this invention the isobutane concentration in the product will be in the range from 50 to 68 percent and will be substantially higher than when using a stirred reactor under otherwise equal conditions.

The height of catalyst in the reactor is desirably at least about 20 feet. The emulsion level is generally maintained within a few feet of the top of the reactor for best results.

Although the reaction has been illustrated with respect to the isomerization of normal butane, substantially the same conditions can be applied in the isomerization of normal pentane. The major difference is that it is desirable to maintain somewhat milder reaction conditions. In particular, the aluminum chloride concentration in the catalyst should be maintained at a lower value. It is preferably in the range from 1 to 5 percent by weight $AlCl_3$ the remainder being $SbCl_3$. It is further generally desirable to maintain at least a small concentration of hydrogen in the reactor while n-pentane is being isomerized. The hydrogen partial pressure is suitably in the range from 0.08 to 33 atmospheres.

The "superficial velocity," as used in the specification and claims, refers to the linear velocity based on total column cross section, i.e. the velocity at which the component, e.g. butane, would pass through the reactor in the absence of any other material in the reactor.

I claim as my invention:

1. A process for the isomerization of paraffin hydrocarbons of from four to five carbon atoms per molecule by the action of an isomerization catalyst consisting of a molten mixture comprising aluminum chloride, hydrogen chloride and antimony trichloride which comprises maintaining a column of said catalyst at least 20 feet deep in a tower at isomerization conditions, introducing feed hydrocarbons in liquid phase to the lower portion of said catalyst column, at a feed rate such that the hydrocarbons pass through the column at a superficial velocity rate of from 1 to 10 feet per minute, withdrawing hydrocarbon reaction product mixture containing at least about 50 percent of isomerization product and containing some catalyst components from a settling zone above said reaction zone, withdrawing a small proportion of catalyst from a lower portion of said settling zone, separating said product mixture to recover therefrom an HCl fraction, a hydrocarbon fraction and a catalyst fraction and recycling said catalyst fraction to the bottom of said reaction zone.

2. A process for the isomerization of paraffin hydrocarbons of from four to five carbon atoms per molecule by the action of an isomerization catalyst consisting of a molten mixture comprising aluminum chloride, hydrogen chloride and antimony trichloride, which process consists in maintaining in an unstirred, substantially vertical columnar reaction zone at least 20 feet in height a two-phase liquid mixture consisting of from 10 to 50 percent by volume of hydrocarbon and from 90 to 50 percent by volume of said catalyst, the catalyst being the continuous phase, at isomerization conditions including a temperature of from 68° to 95° C. and a pressure sufficient to maintain the hydrocarbons in liquid phase, adding said hydrocarbons at the lower end of said reaction zone at a superficial velocity of from 1 to 10 feet per minute, sufficient to maintain the hydrocarbon content of said mixture within said defined range and withdrawing hydrocarbon reaction product mixture containing at least about 50 percent of isomerization product and containing some catalyst components from a settling zone downstream from said reaction zone, withdrawing from a lower portion of said settling zone a small proportion of catalyst contained in said reaction zone, separating said product mixture to recover therefrom a hydrogen chloride fraction, a hydrocarbon fraction and a catalyst fraction, recycling said catalyst fraction to the bottom of said reaction zone, contacting said portion of catalyst withdrawn from the reactor with fresh hydrocarbon feed to dissolve active catalyst components therefrom and separating a sludge fraction for discard.

3. A process according to claim 1 in which said hydrocarbon is normal butane.

4. A process according to claim 1 in which said hydrocarbon is normal pentane, and said reaction zone contains added hydrogen sufficient to suppress hydrocarbon fragmentation.

References Cited in the file of this patent

UNITED STATES PATENTS

| | | |
|---|---|---|
| 2,360,700 | McAllister et al. | Oct. 17, 1944 |
| 2,387,868 | Anderson et al. | Oct. 30, 1945 |
| 2,434,437 | Ross | Jan. 13, 1948 |

OTHER REFERENCES

Perry: "Chemical Engineers' Handbook," third edition, 1950, pages 748 to 753.